United States Patent Office 3,682,849
Patented Aug. 8, 1972

3,682,849
ALCOHOL ETHOXYLATES
George Smith, Oakland, Calif., Webster M. Sawyer, Jr., Houston, Tex., and Rupert C. Morris, Berkeley, Calif., assignors to Shell Oil Company, New York, N.Y.
No Drawing. Continuation-in-part of application Ser. No. 714,434, Mar. 20, 1968. This application Oct. 8, 1970, Ser. No. 79,270
Int. Cl. C07c 43/04, 41/02
U.S. Cl. 260—615 B
6 Claims

ABSTRACT OF THE DISCLOSURE

Certain mixtures of ethylene oxide derivatives of primary alcohols of 11 to 15 carbon atoms, substantially free from alcohol and lower ethoxylates, are surfactants exhibiting superior physical properties.

This application is a continuation-in-part of Ser. No. 714,434, filed Mar. 20, 1968 and now abandoned.

BACKGROUND OF THE INVENTION

Field of the invention

Synthetic surfactants, e.g., detergents, are characterized as compounds which incorporate within the molecular structure thereof a hydrophobic moiety, typically a long-chain alkyl moiety, and also a hydrophilic moiety which because of being polar in character or having ionic charge is capable of interaction with water molecules. When the hydrophilic moiety is characterized by a formal ionic charge, the surfactant is termed anionic or cationic, depending upon the nature of the ionic charge. Alternatively, if the hydrophilic moiety does not possess a formal ionic charge, the surfactant is termed non-ionic. One frequently encountered class of non-ionics comprises alkylene oxide derivatives of active hydrogen compounds, e.g., fatty acids or long-chain alcohols.

Description of the prior art

Simple condensation products of a single alkylene oxide, particularly ethylene oxide, with an alcohol are well known in the art, being exemplified by the disclosures of the U.S. Pats. Nos. 2,213,477; 2,575,298; 2,934,568 and 2,964,564.

Alcohol alkoxylates are conventionally produced by reacting an alcohol with the alkylene oxide in the presence of a catalyst. Such procedures result in the production of a product mixture comprising a number of alcohol derivatives of varying alkoxylate content, which mixtures are rarely separated into individual components but are employed as such. Thus, what is conventionally termed "an alcohol alkoxylate" or more particularly "an alcohol ethoxylate" is in reality a mixture of derivatives of the alcohol moiety having a wide range of alkylene oxide or ethylene oxide units present as well as a certain proportion of unreacted alcohol. Moreover, the conventional designation of the number of ethylene oxide units present per molecule of an alcohol ethoxylate is a designation of the average number of ethylene oxide units present per molecule and there are substantial proportions of alcohol ethoxylate molecules present which have a greater number or alternatively a lesser number of ethylene oxide units present than the actual average value would indicate.

It is known that variations in the average ethylene oxide content of an alcohol ethoxylate result in variations in the properties of the surfactant. Heretofore, however, little has been known about effects resulting from variations in the proportions of ethoxylate molecules of a higher or a lower number of ethylene oxide units than the overall average would indicate.

SUMMARY OF THE INVENTION

It has now been found that alcohol ethoxylate mixtures derived from $C_{11}$–$C_{15}$ alcohols of about 80% straight-chain structure and about 20% 2-alkyl branched-chain structure, when rendered substantially free, i.e., less than about 5% by weight, of non-ethoxylated alcohol and lower ethoxylates, exhibit properties which are superior to those of conventional ethoxylate mixtures of similar ethylene oxide content.

DESCRIPTION OF PREFERRED EMBODIMENTS

The ethoxylated derivatives of the invention comprise a mixture of ethylene oxide derivatives of at least one alcohol of 11 to 15 carbon atoms wherein the average number of ethylene oxide units per molecule is from about 7 to about 11 and the mixture is substantially free from non-ethoxylated alcohol and lower ethoxylates, i.e., lower ethoxylates of three or less ethylene oxide units per molecule. More particularly, the ethoxylated alcohol derivatives are represented as a mixture of compounds of the average formula

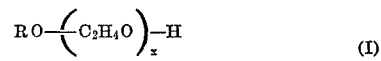
(I)

wherein R is primary alkyl of from 11 to 15 carbon atoms, $x$ is a number from about 7 to about 11 representing an average of the ethylene oxide units per alcohol ethoxylate molecule and the mixture is substantially free of individual components of the above Formula I wherein $x$ is less than 4.

The alcohol precursor: The alcohol precursors of the ethylene oxide derivatives are primary alcohols of the formula ROH where R is primary alkyl of 11 to 15 carbon atoms and is represented by the formula

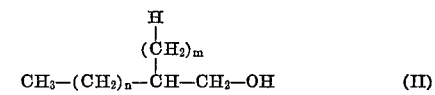
(II)

where $m$ is a whole number from 0 to 5 inclusive and $n$ is a whole number from 3 to 12 inclusive selected so that the sum of $m$ and $n$, i.e., the term $(m+n)$ is a whole number from 8 to 12 inclusive.

The above Formula II provides for alcohols which are straight-chain or which have an alkyl branch in the beta or 2-position, which is methyl, ethyl, propyl, butyl or amyl. At least 60% of the alcohol of each carbon number within the 11 to 15 range is of the straight-chain structure, i.e., the compound of the above Formula II wherein $m$ is 0, and in preferred modifications about 70% to 80% of the alcohols are straight-chain in structure. Of the alcohols that are branched, the predominant type is that having a beta-methyl branch and typically about 50% of the branched alcohols are beta-methyl alcohols with lesser amounts of the other branched-chain isomers.

The alcohols, or the aldehydes corresponding thereto, are produced by the hydroformylation of straight-chain olefins of 10 to 14 carbon atoms as described in, for example, U.S. 3,420,898 and U.S. 3,440,291. In the hydroformylation processes, both straight-chain and branched products are formed. The product mixtures within the desired range of proportions are useful as such or alternatively the individual components are separated by conventional procedures and recombined to provide a mixture of any desired proportion of alcohol types.

It is evident that by starting with an olefin of single carbon number, an alcohol of a single carbon number will result. However, it is also useful to employ mixtures of olefins of more than 1 carbon number and therefore obtain a corresponding mixture of alcohols of more than one carbon number. Although it is useful on occasion to employ a mixture of olefins of each carbon number within the $C_{10}$–$C_{14}$ range to obtain a mixture of $C_{11}$–$C_{15}$ alcohols, for reasons which will become evident hereinbelow it is preferred to produce single carbon number alcohols or alcohol mixtures of no more than two carbon numbers, which carbon numbers are contiguous.

Ethoxylated alcohol derivatives

The ethoxylated alcohol derivatives, as previously stated, are ethylene oxide derivatives of at least one primary alcohol in the $C_{11}$ to $C_{15}$ range as defined above. In terms of the above Formulas I and II, the preferred derivatives are represented by the formula

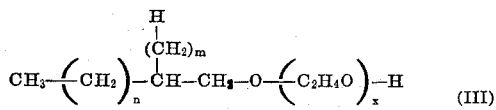

$$CH_3-(CH_2)_n-\overset{\overset{H}{|}\underset{(CH_2)_m}{}}{CH}-CH_2-O-(C_2H_4O)_x-H \qquad (III)$$

wherein $m$, $n$ and $x$ have the previously stated significance. It should be appreciated that there will be present ethoxylated derivatives of at least one alcohol of a carbon number of 11, 12, 13, 14 or 15, that is, ethoxylated derivatives of one or more $C_{11}$ to $C_{15}$ alcohols. In the case of mixtures of derivatives of alcohols of differing carbon number, the relative proportions of derivatives of alcohol of each carbon number are not critical. Preferred mixed compositions comprise no more than about 75% by weight of derivatives of any one alcohol within the $C_{11}$ to $C_{15}$ range, more preferably no more than from about 40% to about 60% by weight on the same basis. In part because of relative simplicity of production, mixtures of derivatives of alcohols of two contiguous carbon numbers are especially preferred, particularly ethoxylated derivatives of a mixture of $C_{12}$ and $C_{13}$ alcohols.

The ethoxylated alcohol derivatives are produced in part by more or less conventional methods. Suitable results are obtained by adding to the alcohol or mixture of alcohols to be ethoxylated a calculated amount, e.g., from about 0.1% by weight to about 0.6% by weight, preferably from about 0.1% to about 0.4%, based on total alcohol of a strong base, typically an alkali metal hydroxide such as sodium hydroxide or potassium hydroxide, which serves as catalyst for the ethoxylation. The resulting mixture is dried, as by vapor phase removal of any water present, and an amount of ethylene oxide calculated to provide from about 4.5 to about 9 moles of ethylene oxide per mole of alcohol is then introduced and the resulting mixture is allowed to react until the ethylene oxide is consumed, the course of the reaction being followed by the decrease in reaction pressure.

The ethoxylation is conducted at an elevated temperature and pressure. Suitable reaction temperatures are from about 120° C. to about 220° C. with the range of from about 140° C. to about 160° C. being preferred. A suitable reaction pressure is achieved by introducing to the reaction vessel the required amount of ethylene oxide which has a high vapor pressure at the desired reaction temperature. The pressure serves as a measure of the degree of reaction and the reaction is considered to be substantially complete when the pressure no longer decreases with time.

It should be understood that the ethoxylation procedure serves to introduce a desired average number of ethylene oxide units per alcohol ethoxylate molecule. For example, treatment of an alcohol mixture with 5 moles of ethylene oxide per mole of alcohol serves to effect the ethoxylation of each alcohol molecule with an average of 5 ethylene oxide moieties per alcohol moiety, although a substantial proportion of alcohol moieties will become combined with more than 5 ethylene oxide moieties and an approximately equal proportion will have become combined with less than five. In a typical ethoxylation product mixture, there is also a minor proportion of unreacted alcohol.

To prepare the improved alcohol ethoxylates of the invention, any unreacted alcohol and the lower ethoxylates are removed from the conventionally produced ethoxylate mixture. Although other methods of removal are available, the preferred method of alcohol and lower ethoxylate removal comprises vapor phase removal of essentially all the non-ethoxylated alcohol and the monoethoxylate and substantially all the diethoxylate and triethoxylate so that the product mixture subsequent to such removal of non- and lower ethoxylates is substantially free from alkanol and derivatives thereof of less than 4 ethylene oxide units. Illustrative of suitable methods for vapor-phase removal of the light components of the initial ethoxylation product mixture are distillation and evaporation conducted at pressures which are at or preferably below atmospheric.

So long as ethoxylate derivatives of alcohols of single carbon number or of two contiguous carbon numbers are employed, no problems arise with regard to overlap of boiling points or vapor pressures between desirable and undesirable components of the conventional ethoxylation product mixture. Such overlap does exist between desirable and undesirable components of a mixture of derivatives of alcohols of 3 or more carbon numbers or two non-contiguous carbon numbers with the result that separation of only the lighter components in the vapor phase becomes difficult. Therefore, when a final product containing derivatives of at least two alcohols of non-contiguous carbon number is desired, preferred procedures comprise ethoxylating more than one alcohol fraction of no more than two carbon numbers which are contiguous, separating the light components from each fraction and combining the resulting derivative mixtures which have been freed from non-ethoxylated alcohol and lower ethoxylates. For example, to prepare an improved ethoxylate mixture derived from alcohols of 12, 13, 14 and 15 carbon atoms, it is useful to produce an ethoxylated product from the individual or mixed $C_{12}$ and $C_{13}$ alcohols and also from the individual or mixed $C_{14}$ and $C_{15}$ alcohols. Each product mixture is then subjected to vapor phase removal of the light components and the resulting ethoxylate mixtures, devoid of alcohol and lower ethoxylates, are combined to produce the desired blend.

It would be desirable to effect the vapor-phase removal of all of the unreacted alcohol and ethoxylate of less than 4 ethylene oxide units and in a highly efficient distillation process such is effectively accomplished. From a commercial viewpoint, however, an efficient distillation might not be practical and minor proportions of the di- and tri-ethoxylates can be tolerated without losing the benefits of the invention if the amounts of such materials are not unduly high. Satisfactory alcohol ethoxylate mixtures contain an amount of alkanol and monoethoxylate which is less than 1% by weight each, an amount of diethoxylate which is less than about 2% by weight, preferably less than about 1% by weight, and an amount of triethoxylate which is less than about 3% by weight, preferably less than about 2% by weight. Satisfactory total of amounts of alkanol, monoethoxylate, diethoxylate and triethoxylate is less than about 5% by weight, but preferably less than about 3% by weight.

It should be appreciated that removal of the relatively light weight components of a conventional ethoxylate mixture results in an overall increase in the average number of ethylene oxide units per molecule. Thus vapor phase removal of about 15–35% by weight of low-boiling components of a conventionally produced alcohol ethoxylate mixture having an average of 5 ethylene oxide per molecule serves to effect the removal of substantially all material of 3 or less ethylene oxide units and the resulting product mixture has an average number of ethylene oxide units per molecule between 7 and 7.5. The alcohol ethoxylate mixtures of the invention are accordingly produced by initial ethoxylation to an average number of ethoxylate units per molecule between about 4.5 and about 9 and subsequently removing in the vapor phase from about 15% to about 35%, preferably from about 20% to 25% of the lower boiling components of the initial ethoxylation product mixture. The precise composition of the product mixture resulting from vapor-phase removal is easily established as by conventional gas-liquid chromatographic techniques. However, ethoxylation to give from about 4.5 to about 9 ethylene oxide units per molecule followed by vapor-phase removal of 15–35% of the initial product typically affords product mixtures within the desired composition ranges.

The alcohol ethoxylates of the invention are useful as surfactants and particularly as non-ionic detergents in the washing of clothes and other materials. The alcohol ethoxylates are useful per se or are combined with other surfactants, sequestering agents, wetting agents and the like.

The compositions are generally characterized by lower pour points, lower melting points, higher cloud points, lower gel temperatures, and better detergency than conventional ethoxylates of similar average ethylene oxide content but having unreacted alcohol and lower alkoxylates within the composition.

To further illustrate the novel alcohol ethoxylates of the invention and the production thereof, the following examples are provided. In the examples the detergent properties of the claimed alcohol ethoxylates which are substantially free of non-ethoxylated alcohols and lower ethoxylates are compared with the detergent properties of alcohol ethoxylates which have not been rendered free of non-ethoxylated alcohol and lower ethoxylates. In detergent applications, it is well known that the average number of ethoxylate units per molecule in an extremely important factor in detergency performance because of the critical balance between the hydrophobic moiety (the alkyl chain) and the hydrophilic moiety (the ethoxylate units) of the alcohol ethoxylate. Consequently, the claimed ethoxylate compositions are herein compared with conventional alcohol ethoxylates with substantially the same number of ethoxylate units per molecule to insure substantially the same balance of hydrophobic and hydrophilic character.

EXAMPLE I

An ethoxylate within the scope of the invention was prepared employing as the alcohol feed an anhydrous mixture derived from 0.96 g. of sodium hydroxide and 317.6 g. of mixed $C_{12}$ and $C_{13}$ primary alcohols, in substantially equal proportions by weight, wherein approximately 80% of the alcohol of each carbon number was straight-chain, approximately 10% of the alcohol of each carbon number was beta-methyl branched and the remainder of the alcohol of each carbon number comprised alcohols of beta-ethyl, beta-propyl, beta-butyl or beta-amyl branching.

The temperature of the reactor in which the mixture was maintained was raised to 150° C. and kept at that temperature as 362 g. of ethylene oxide was gradually introduced to the stirred reaction mixture. At the conclusion of the ethylene oxide addition, the stirring was continued until the pressure no longer continued to drop. The mixture was then cooled to ambient temperature and neutralized with 1.44 g. of acetic acid. Analysis of a portion of the 670 g. of product mixture by means of its nuclear magnetic spectrum indicated an average of 4.8 ethylene oxide units per molecule. The initial product mixture was then subjected to distillation at 163° C. at less than 1 mm. of Hg pressure until 20% of the mixture was overheaded and at 170° C. at less than 1 mm. Hg until an additional 5% of the initial product was removed. The distillation bottoms were found to have less than about 5% by weight total of alcohol and ethoxylates of 3 or less ethylene units per molecule and to contain an average of 7.2 ethylene oxide units per molecule.

EXAMPLE II

An extensive evaluation of a number of variously prepared ethoxylate derivatives of the $C_{12}$–$C_{13}$ mixture described in Example I was made. In making the evaluations, and in the tables which follow, certain terms are employed which are defined as follows:

Cloud point: The temperature at which a 1% by weight solution of a surfactant turns from clear to cloudy, as the temperature is raised.

Gel temperature: The temperature at which a specified mixture of surfactant and water undergoes a second-order transition between gel and mobile phases, the former being characterized by its high viscosity and in most cases by birefringence.

Pour point: The lowest temperature at which a liquid will flow when its container is inverted.

Wetting time: The standard Draves Wetting Test, determined at 25° C. and also at 60° C.

The compositions evaluated, in terms of the character of the ethylene oxide derivatives present are described below.

(A) A mixture of the $C_{12}$–$C_{13}$ alcohols conventionally ethoxylated to an average of 6.5 ethylene oxide units per molecule, containing some unreacted alcohol and alcohol ethoxylates of 1, 2 and 3 ethylene oxide units per molecule.

(B) A mixture of $C_{12}$–$C_{13}$ alcohol ethoxylates, prepared by a procedure similar to that of Example I, having an average of 7.2 ethylene oxide units per molecule and containing less than 5% by weight total of alcohol and ethoxylates of 3 or less ethylene oxide units per molecule.

TABLE I

| Composition | A | B |
| --- | --- | --- |
| Pour point, °F | 60 | 45 |
| Cloud temperature, °C | 41 | 58 |
| Wetting time, sec.: | | |
| 25° C | 7.7 | 8.8 |
| 60° C | 8.6 | 11.9 |
| Gel temperature, nonionic/water at °C.: | | |
| 80/20 | 30 | 31 |
| 70/30 | 42 | 54 |
| 60/40 | 71 | 28 |
| 50/50 | 80 | 36 |
| 40/60 | 87 | 32 |
| 30/70 | 32 | 2 |

EXAMPLE III

By the procedure of Example I, ethoxylations were conducted employing $C_{11}$ primary alcohol as the alcohol reactant. Approximately 80% of the alcohol was straight-chain, approximately 10% had a beta-methyl branch and the remainder comprised alcohol with beta-ethyl, beta-propyl, beta-butyl or beta-amyl branch.

In one run, a conventional ethoxylation was conducted to give a product of an average of 6.9 ethylene oxide units per molecule. A second run afforded an initial product having an average of 5 ethylene oxide units per molecule. Removal by distillation of 20% of this latter product provided as bottoms a product mixture having an average of 7.3 ethylene oxide units per molecule and containing less than 5% by weight of alcohol and ethoxylates of 3 or less ethylene oxide units per molecule. A comparison of the properties of these two products is provided in Table II, wherein the headings have the previously defined significance.

TABLE II

| Product of run | 1 | 2 |
| --- | --- | --- |
| Pour point, °F | 60 | 50 |
| Cloud temperature, °C | 63 | 71 |
| 25° C | 6.7 | 5.7 |
| 60° C | 4.7 | 3.7 |
| Gel temperature, nonionic/water at °C: | | |
| 70/30 | 28 | 12 |
| 50/50 | 31 | 43 |

EXAMPLE IV

Employing a mixture of $C_{12}$ and $C_{13}$ alcohols as described in Example I, a conventional ethoxylate product was produced having an average of 7 ethylene oxide units per molecule. A conventional 7-ethoxylate derivative was produced from an equal-weight mixture of $C_{14}$ and $C_{15}$ alcohols of similar isomer distribution. These ethoxylates were blended in equal proportions by weight to give a mixture of ethoxylates of $C_{12}$, $C_{13}$, $C_{14}$ and $C_{15}$ alcohols of an average of 7-ethylene oxide units per molecule which contained some unreacted alcohol and lower ethoxylates. This mixture is termed product "A" for the purposes of Table III which follows.

A composition within the scope of the invention was produced by the following procedure. A mixture of $C_{12}$ and $C_{13}$ alcohols as above described was ethoxylated to an average value of 4.8 ethylene oxide units per molecule. Removal by distillation of 20% of this initial product afforded a second product, substantially free from alcohol and lower ethoxylates, which had an average of 6.8 ethylene oxide units per molecule. In similar manner, a mixture of $C_{14}$ and $C_{15}$ alcohols was employed to produce an ethoxylate of an average of 4.7 ethylene oxide units per molecule. Removal of approximately 20% yielded a second product of an average of 7.5 ethylene oxide units per molecule which was substantially free from alcohol and lower ethoxylates. Upon blending equal parts of the two purified products, a composition, identified as "B" in Table III, was obtained which contained substantially equal proportions by weight of ethoxylates of $C_{12}$, $C_{13}$, $C_{14}$ and $C_{15}$ alcohols of an average of 7.15 ethylene oxide units per molecule.

A comparison of the properties of the conventional and the improved composition is provided in Table III.

TABLE III

| Composition | A | B |
|---|---|---|
| Pour point, ° F | 65 | 55 |
| Cloud temperature, ° C | 44 | 63.5 |
| Wetting time, sec.: | | |
| 25° C | 14.7 | 8.9 |
| 60° C | 27.1 | 4.9 |
| Gel temperature, nonionic/water at ° C: | | |
| 70/30 | 77 | 47 |
| 50/50 | 90 | 42.5 |

EXAMPLE V

The primary $C_{11}$ alcohol described in Example III, the mixed $C_{12}$ and $C_{13}$ alcohols of Example I and the mixed $C_{14}$ and $C_{15}$ alcohols of Example IV were each used as the feed for production of an ethoxylate of 7-ethylene oxide units per molecule. Blending the products in a 1:2:2 ratio by weight afforded a composition of approximately equal parts by weight of derivatives of $C_{11}$-$C_{15}$ alcohols of an average of 7-ethylene oxide units per molecule. This composition, containing a certain proportion of non-ethoxylates is identified as composition "A" in Table IV.

To prepare a similar composition free from the light components, the $C_{11}$ alcohol was ethoxylated to give a product of an average of 5 ethylene oxide units per molecule. Distillation of 20% of this product afforded a bottoms product having an average of 7.3 ethylene oxide units per molecule and containing less than 5% by weight total of unreacted alcohol and lower ethoxylates. In similar fashion, an ethoxylate derivative of the mixed $C_{12}$ and $C_{13}$ alcohols of an average of 6.8 ethylene oxide units per molecule was produced by vapor phase removal of approximately 20% of an initial ethoxylate having an average of 4.8 ethylene oxide units per molecule, and an ethoxylate derivative of the mixed $C_{14}$ and $C_{15}$ alcohols of an average of 7.5 ethylene oxide units per molecule was produced by vapor-phase removal of approximately 20% of an initial ethoxylate derivative of an average of 4.7 ethylene oxide units per molecule. These three purified ethoxylates were blended in a 1:2:2 weight ratio to give a composition, identified as "B" in Table IV, which contained derivatives of the $C_{11}$, $C_{12}$, $C_{13}$, $C_{14}$ and $C_{15}$ alcohols in approximately equal proportions by weight, which had an average value of 7.2 ethylene oxide units per molecule and which was substantially free from non-ethoxylated alcohol and lower ethoxylates.

A comparison of the properties of these compositions is provided in Table IV.

TABLE IV

| Composition | A | B |
|---|---|---|
| Pour point, ° F | 65 | 55 |
| Cloud temperature, ° C | 48 | 63 |
| Wetting time, sec.: | | |
| 25° C | 12.1 | 21.9 |
| 60° C | 7.5 | 4.7 |
| Gel temperature, nonionic/water at ° C.: | | |
| 70/30 | 71 | 45 |
| 50/50 | 88 | 41 |

EXAMPLE VI

A sample of mixed $C_{12}$-$C_{15}$ primary alcohol ethoxylates having an average of 9 ethylene oxide units per molecule in substantially equal proportions by weight, wherein approximately 75% of the alcohol of each carbon number was straight-chain and the remainder of the alcohol was beta-methyl, beta-ethyl, beta-propyl, beta-butyl or beta-amyl branched (Neodol®25-9 Alcohol Ethoxylates) was subjected to distillation in a wiped film evaporator at 215–222° C. at 0.1–0.35 mm. of Hg pressure until 15% of the mixture was overheaded. The distillation bottoms were found to contain 0.05% by weight of non-ethoxylated alcohol, 0.08% by weight of monoethoxylates, 0.5% by weight of diethoxylates and 1.1% by weight of triethoxylates, and to have an average of 11 ethylene oxide units per molecule.

We claim as our invention:

1. The alcohol ethoxylate composition of the formula

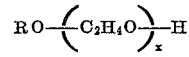

wherein $x$ is a number from about 7 to about 11 representing the average number of ethylene oxide units per molecule, said ethoxylate composition containing less than about 1% each of non-ethoxylated alcohols and monoethoxylates, less than 2% by weight of diethoxylates and less than 3% by weight of triethoxylates, and R is a mixture of contiguous alkyl moieties of from 11 to 15 carbon atoms of the formula

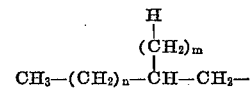

wherein $m$ is a whole number from 0 to 5 inclusive and is 0 in 70% to 80% of said alkyl moieties and $n$ is a whole number from 3 to 12 inclusive selected so that the sum of $m+n$ is a whole number from 8 to 12 inclusive, with the proviso that about 70% to 80% of all the alkyl moieties of a given carbon number are straight-chain.

2. The alcohol ethoxylate composition of claim 1 wherein no more than 75% by weight of R is a mixture of alkyl moieties of any one number of said carbon atoms and wherein the total amount of non-ethoxylated alcohol, monoethoxylate, diethoxylate and triethoxylate is less than about 5% by weight.

3. The alcohol ethoxylate composition of claim 2 wherein the total R is a mixture of R moieties of two contiguous carbon numbers.

4. The alcohol ethoxylate composition of claim 3 wherein the contiguous carbon numbers are 12 and 13.

5. The alcohol ethoxylate composition of claim 2 wherein the total R is a mixture of R moieties of 12 to 15 carbon atoms.

6. The alcohol ethoxylate composition of claim 5 wherein the total amount of non-ethoxylated alcohols, monoethoxylates, diethoxylates and triethoxylates is less than 3% by weight.

References Cited

UNITED STATES PATENTS

| 2,575,298 | 11/1951 | Ryznar | 260—615 B X |
|---|---|---|---|
| 2,934,568 | 4/1960 | Barker | 260—615 B |
| 2,964,564 | 12/1960 | Blaser et al. | 260—615 B X |
| 3,426,077 | 2/1969 | Eiseman et al. | 260—615 B |
| 3,428,692 | 2/1969 | Starks et al. | 260—615 B X |

FOREIGN PATENTS

| 551,507 | 1/1958 | Canada | 260—615 B |
|---|---|---|---|
| 796,508 | 6/1958 | Great Britain | 260—615 B |
| 950,844 | 2/1964 | Great Britain | 260—615 B |

HOWARD T. MARS, Primary Examiner

U.S. Cl. X.R.

252—DIG 1, 89, 135